(12) United States Patent  
Shintani et al.

(10) Patent No.: US 8,698,491 B2
(45) Date of Patent: Apr. 15, 2014

(54) POSITION DETECTING DEVICE

(71) Applicant: Denso Corporation, Kariya (JP)

(72) Inventors: Hiroyuki Shintani, Nagoya (JP);
Takamitsu Kubota, Chiryu (JP);
Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/760,410

(22) Filed: Feb. 6, 2013

(65) Prior Publication Data
US 2013/0214767 A1    Aug. 22, 2013

(30) Foreign Application Priority Data

Feb. 17, 2012 (JP) .................................. 2012-32553

(51) Int. Cl.
*G01B 7/30*    (2006.01)
(52) U.S. Cl.
USPC ................................................... 324/207.25
(58) Field of Classification Search
CPC ......... G01D 5/00; G01D 5/142; G01D 5/145; G01B 7/14; G01B 7/30
See application file for complete search history.

(56) References Cited

U.S. PATENT DOCUMENTS 5,260,877 A     11/1993 Drobny et al.
6,144,197 A *  11/2000 Shimamura et al. .......... 324/166

FOREIGN PATENT DOCUMENTS

JP          3588127 B2    11/2004

* cited by examiner

*Primary Examiner* — Jay Patidar
(74) *Attorney, Agent, or Firm* — Nixon & Vanderhye PC

(57) ABSTRACT

A position detecting device has an output circuit, which controls voltages of signal lines connecting a power supply and a ground by a power side transistor and a ground side transistor. An output signal line connects a connection point of the signal lines and an output terminal. A first comparator circuit outputs a signal "1" when a current flowing in the line between the power supply and the connection point is larger than a normal current flowing into the ground from the power supply in a normal state. A second comparator circuit outputs a signal "1" when a current flowing in the line between the connection point and the ground is larger than the normal current. When the signal "1" is output from the first comparator circuit or the second comparator circuit, a cutoff circuit turns off a switch disposed in the output signal line.

9 Claims, 12 Drawing Sheets

|  | FACTORY WRITE BIT (OUTPUT DESIGNATION BIT) |
|---|---|
| CONTROL SIGNAL: POSITIVE | 0 |
| CONTROL SIGNAL: NEGATIVE | 1 |

|  | CURRENT SWITCH 61 |
|---|---|
| HIGH OUTPUT (CURRENT FLOW: IC11 → IC21) | ON |
| LOW OUTPUT (CURRENT FLOW: IC21 → IC11) | OFF |

POSITION DETECTING DEVICE

CROSS REFERENCE TO RELATED APPLICATION

This application is based on and incorporates herein by reference Japanese patent application No. 2012-032553 filed on Feb. 17, 2012.

TECHNICAL FIELD

The present disclosure relates to a position detecting device that detects a rotation angle or a stroke amount of an object to be detected.

BACKGROUND

Many conventional position detecting devices detect a rotation angle of a throttle valve, which controls a quantity of air sucked into a cylinder of an internal combustion engine for a vehicle. The position detecting device has a magnetic detection element for detecting a magnetism developed by a magnet disposed in the throttle valve and outputs the detected magnetism value to an electronic control unit (ECU) for the vehicle. The ECU supplies a current to a motor for rotating the throttle valve so that the rotation angle of the throttle valve, which is calculated on the basis of a signal output from the position detecting device matches a target rotation angle of the throttle valve, which is set variably according to an operating state of the internal combustion engine.

The position detecting device disclosed in JP 3588127 (U.S. Pat. No. 5,260,877) includes two integrated circuits. One integrated circuit has a positive characteristic, by which a signal to be output to the ECU increases as the magnetism that acts on the magnetic detection element increases. The other integrated circuit has a negative characteristic, by which the signal to be output to the ECU decreases as the magnetism that acts on the magnetic detection element increases.

In JP 3588127, an abnormality of the position detection device is detected based on an assumption that a sum of signal values output from the two integrated circuits is theoretically kept constant.

However, when output terminals of the two integrated circuits are short-circuited, an intermediate potential of voltage signals to be output from the two integrated circuits is output to the ECU. Even in this case, the sum of the signal values output from the two integrated circuits is generally kept constant. For this reason, the position detecting device of JP 3588127 cannot detect short-circuiting of the output terminals of the two integrated circuits. For this reason, when the output terminals of the two integrated circuits are short-circuited, and a larger current flows from one integrated circuit into the other integrated circuit than in a normal state, output circuits provided in the integrated circuits are likely to be damaged.

SUMMARY

It is therefore an object to provide a position detecting device that can protect output circuits of plural integrated circuits when output terminals of the same are short-circuited.

According to one aspect, a position detecting device comprises a plurality of integrated circuits, each of which includes a magnetism detection element that outputs a signal corresponding to a magnetism of a magnetic generation unit disposed in an object to be detected, a signal processor circuit that processes the signal output from the magnetism detection element, and an output circuit that outputs the signal processed by the signal processor circuit from an output terminal to an electronic control unit that controls a vehicle. The output circuit includes a power side transistor and a ground side transistor, which are connected in series with signal lines that connect a power supply and a ground and control a voltage of the signal lines, a control circuit that controls the power side transistor and the ground side transistor based on the signal processed by the signal processor circuit, an output signal line having one end connected to a connection point of the signal lines connecting the power side transistor and the ground side transistor, and the other end connected to the output terminal, a power side current detector circuit that detects a current flowing in the signal line between the power supply and the connection point, a ground side current detector circuit that detects a current flowing in the signal line between the connection point and the ground, a first comparator circuit that outputs a first abnormal signal when a current value detected by the power side current detector circuit is larger than a normal value of a current flowing from the power supply to the ground in a normal state, a second comparator circuit that outputs a second abnormal signal when a current value detected by the ground side current detector circuit is larger than the normal value, and a cutoff unit that cuts off conduction of the output signal line when the first abnormal signal is output from the first comparator circuit, or when the second abnormal signal is output from the second comparator circuit.

BRIEF DESCRIPTION OF THE DRAWINGS

The above and other objects, features and advantages will become more apparent from the following detailed description made with reference to the accompanying drawings. In the drawings.

DETAILED DESCRIPTION OF THE EMBODIMENT

Figure 1:
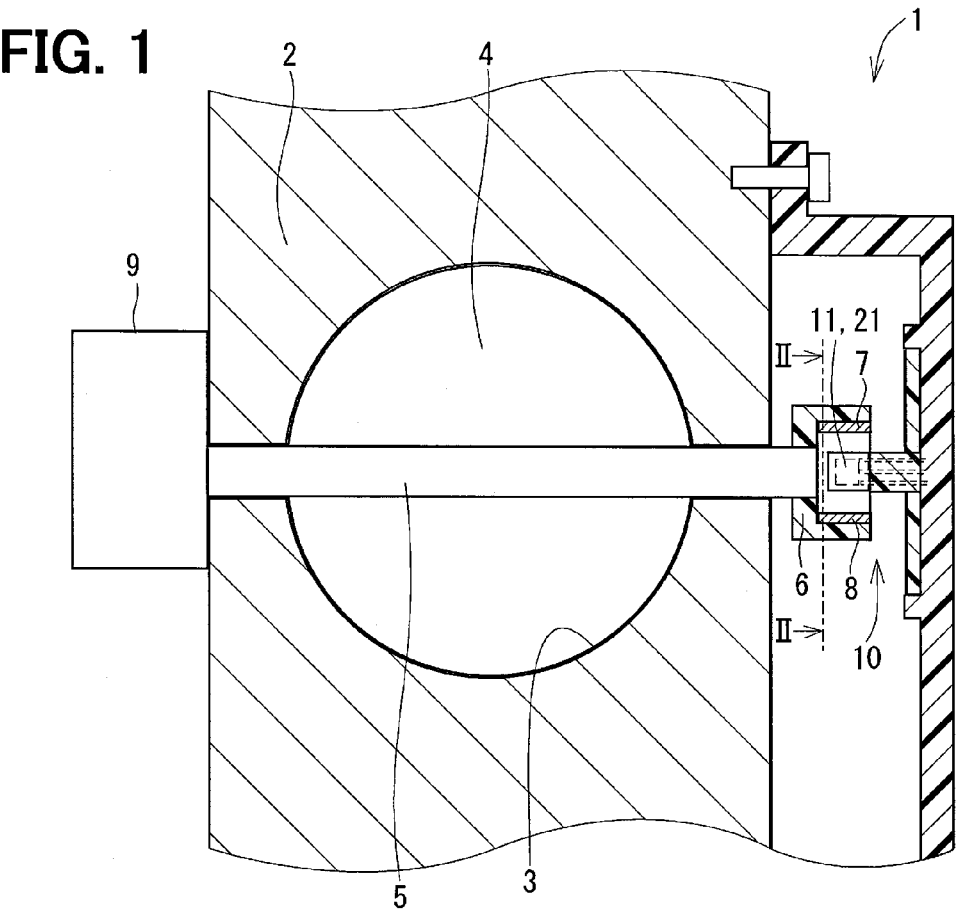
FIG. 1 is a cross-sectional view illustrating an electronic control throttle using a position detecting device according to a first embodiment.
Figure 2:
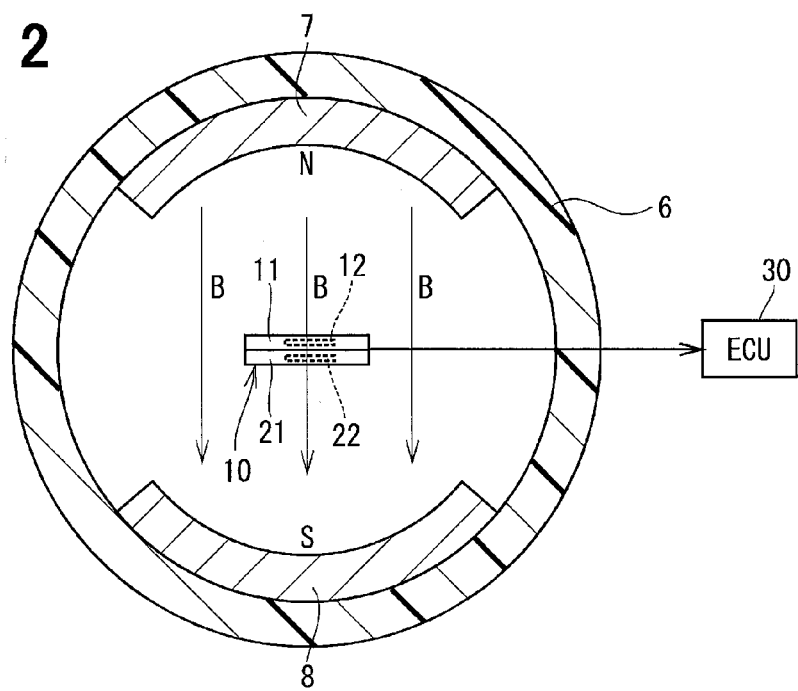
FIG. 2 is a cross-sectional view taken along a line II-II in FIG. 1.

Hereinafter, a position detecting device will be described with reference to plural embodiments shown in the accompanying drawings. In the embodiments, substantially the same or similar configurations are denoted by the same or similar symbols, and their description will be omitted.

(First Embodiment)

A position detecting device according to a first embodiment is illustrated in FIGS. 1 to 10 and designated by reference numeral 10. The position detecting device 10 is used in an electronic control throttle 1 that controls a quantity of air to be sucked into a cylinder of an internal combustion engine for a vehicle.

As shown in FIG. 1, a housing 2 of the electronic control throttle 1 has an intake passage 3 that introduces air into the internal combustion engine. A throttle valve 4 formed into a substantially disc shape is disposed within the intake passage 3. The throttle valve 4 is integrated with a valve shaft 5. Both ends of the valve shaft 5 are rotatably supported on the housing 2. With this configuration, the throttle valve 4 can be rotated about the valve shaft 5 as a rotating shaft.

One end of the valve shaft 5 is fixed with a cylindrical yoke 6, and two permanent magnets 7 and 8 are disposed on a radial inner side of the yoke 6 to face each other. The permanent magnets 7 and 8 are used as a magnetism generation unit. As schematically indicated by arrows B in FIG. 2, a magnetic flux flows between those two permanent magnets 7 and 8 in a direction substantially perpendicular to the rotating shaft of the throttle valve 4.

The position detecting device 10 includes two (first and second) integrated circuits 11 and 21 fixedly disposed in a rotating magnetic field generated by the permanent magnets 7 and 8. The integrated circuits 11 and 21 are each formed of an electronic component in which magnetism detection elements 12, 22, a signal processor circuit, and an output circuit are integrated together. The magnetism detection elements 12 and 22 are exemplified by, for instance, a Hall element, or a magneto-resistive effect device.

When the position detecting device 10 and the permanent magnets 7, 8 rotate relative to each other, a density of magnetic flux that passes through magnetic sensitive surfaces of the magnetism detection elements 12 and 22 is changed. Those two integrated circuits 11 and 21 each output a voltage signal corresponding to the change in the magnetic flux density to an electronic control unit (ECU) 30 for the vehicle. The ECU 30 supplies a current to a motor 9 that drives the throttle valve 4 so that the opening angle, that is, rotation angle, of the throttle valve 4, which is calculated according to the voltage signal, matches a target opening angle set according to an operating state of the internal combustion engine. The opening angle of the throttle valve 4 is controlled by driving of the motor 9 to adjust an intake quantity of air to be supplied to the internal combustion engine.

Figure 3:
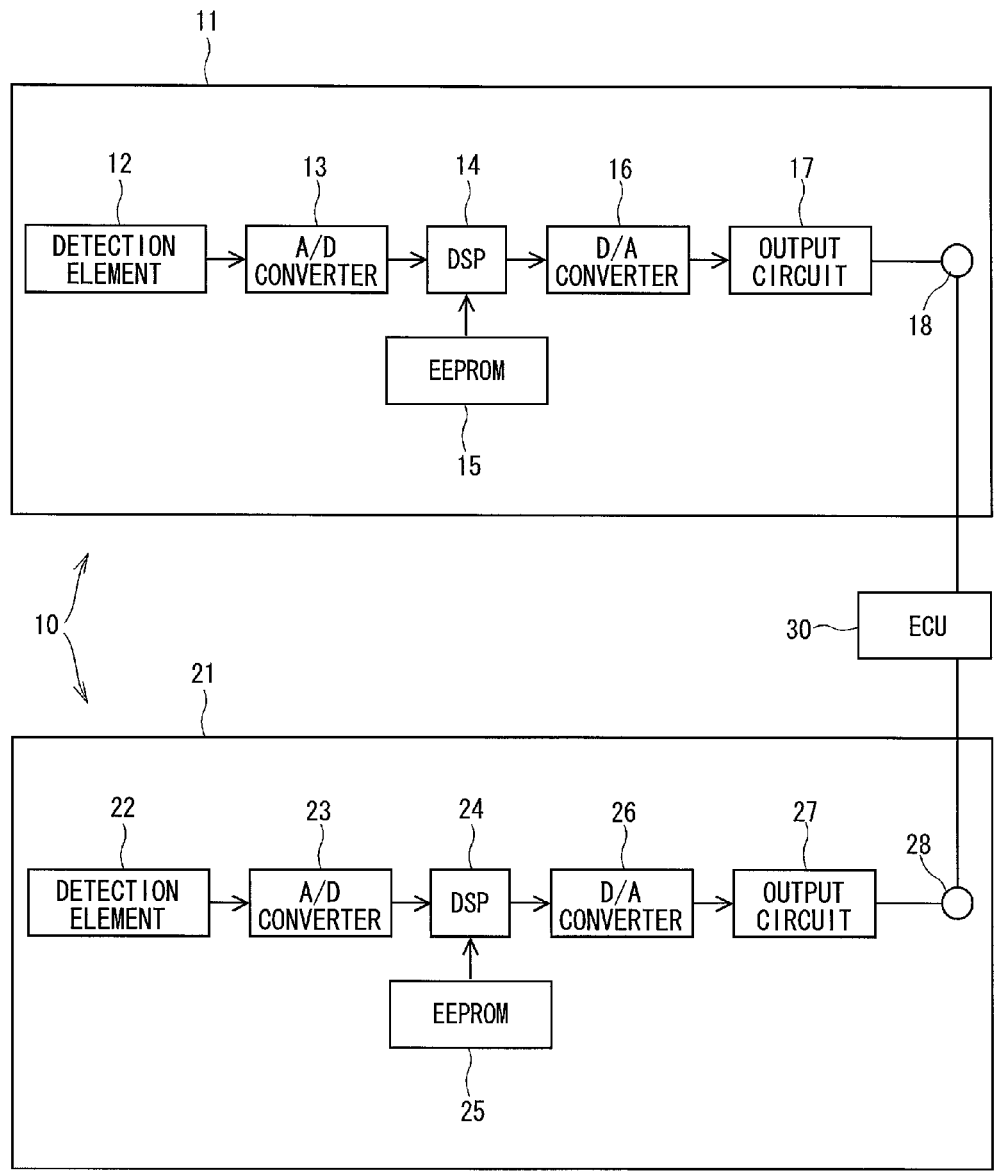
FIG. 3 is a block diagram illustrating a circuit of the position detecting device according to the first embodiment.
Figures 4, 5:
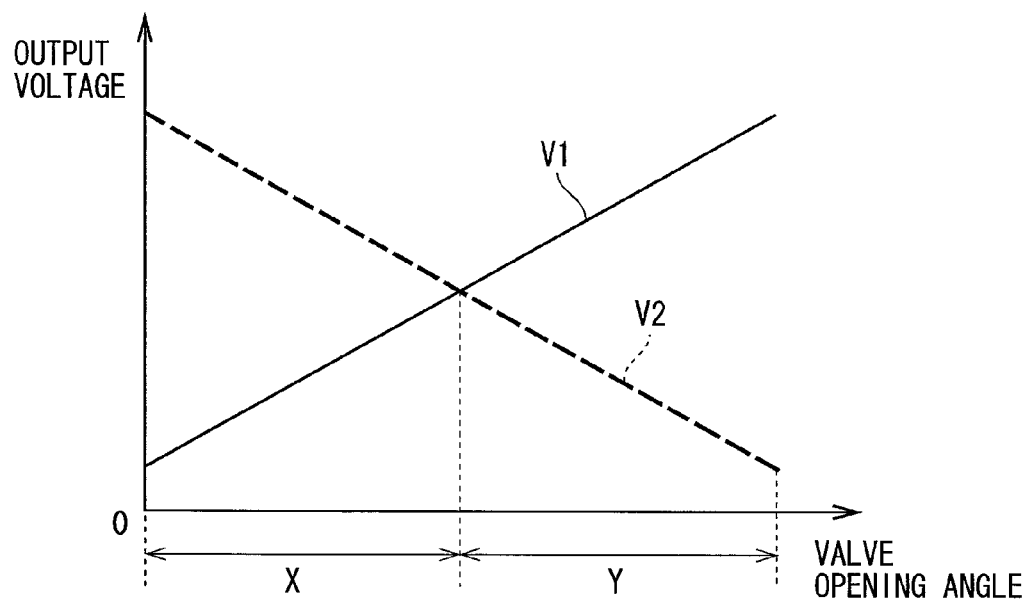
FIG. 4 is a characteristic diagram illustrating an output signal in a normal state of the position detecting device according to the first embodiment.
FIG. 5 is a table stored in a storage unit of the position detecting device according to the first embodiment.

The first and the second integrated circuits 11 and 21 provided in the position detecting device 10 are illustrated in FIGS. 3 and 4. The first and the second integrated circuits 11 and 21 are substantially identical in configuration with each other.

Voltages output from the magnetism detection elements 12 and 22 according to the densities of magnetic flux that pass through the magnetism detection elements 12 and 22 are subjected to analog-to-digital conversion through A/D converters 13 and 23, and input to digital signal processors (DSPs) 14 and 24. The DSPs 14 and 24 conduct offset adjustment, gain adjustment, and clamp adjustment on the basis of set values pre-stored in EEPROMs 15 and 25, respectively.

An offset of an output voltage relative to the opening angle of the throttle valve 4 is set by the offset adjustment. An inclination or slope of the output voltage relative to the opening angle of the throttle valve 4 is set by the gain adjustment. A maximum output voltage and a minimum output voltage are set by the clamp adjustment.

Values adjusted by the DSPs 14 and 24 are subjected to digital-to-analog conversion by D/A converters 16 and 26, and input to output circuits 17 and 27, respectively. The output circuits 17 and 27 output voltage signals to the ECU 30 through output terminals 18 and 28, respectively.

The A/D converters 13, 23, the DSPs 14, 24, the EEPROMs 15, 25, and the D/A converters 16, 26 are provided as a signal processor circuit.

A characteristic of the output signal from the position detecting device 10 to the ECU 30 in the normal state is illustrated in FIG. 4.

A first voltage signal V1 output from the first integrated circuit 11 has a positive characteristic that the voltage signal V1 increases proportionally as the opening angle of the throttle valve 4 increases. A second voltage signal V2 output from the second integrated circuit 21 has a negative characteristic that the voltage signal V2 decreases as the opening angle of the throttle valve 4 increases.

In the normal state, the ECU 30 uses the voltage signal V1 of the positive characteristic output from the integrated circuit 11 as a control signal for driving the motor 9. Also, the ECU 30 uses the voltage signal V2 of the negative characteristic output from the integrated circuit 21 as a monitor signal for monitoring operation states of the two integrated circuits 11 and 21. Thus, the integrated circuits 11 and 21 are provided for a control operation and a monitor operation, respectively.

Figure 6:
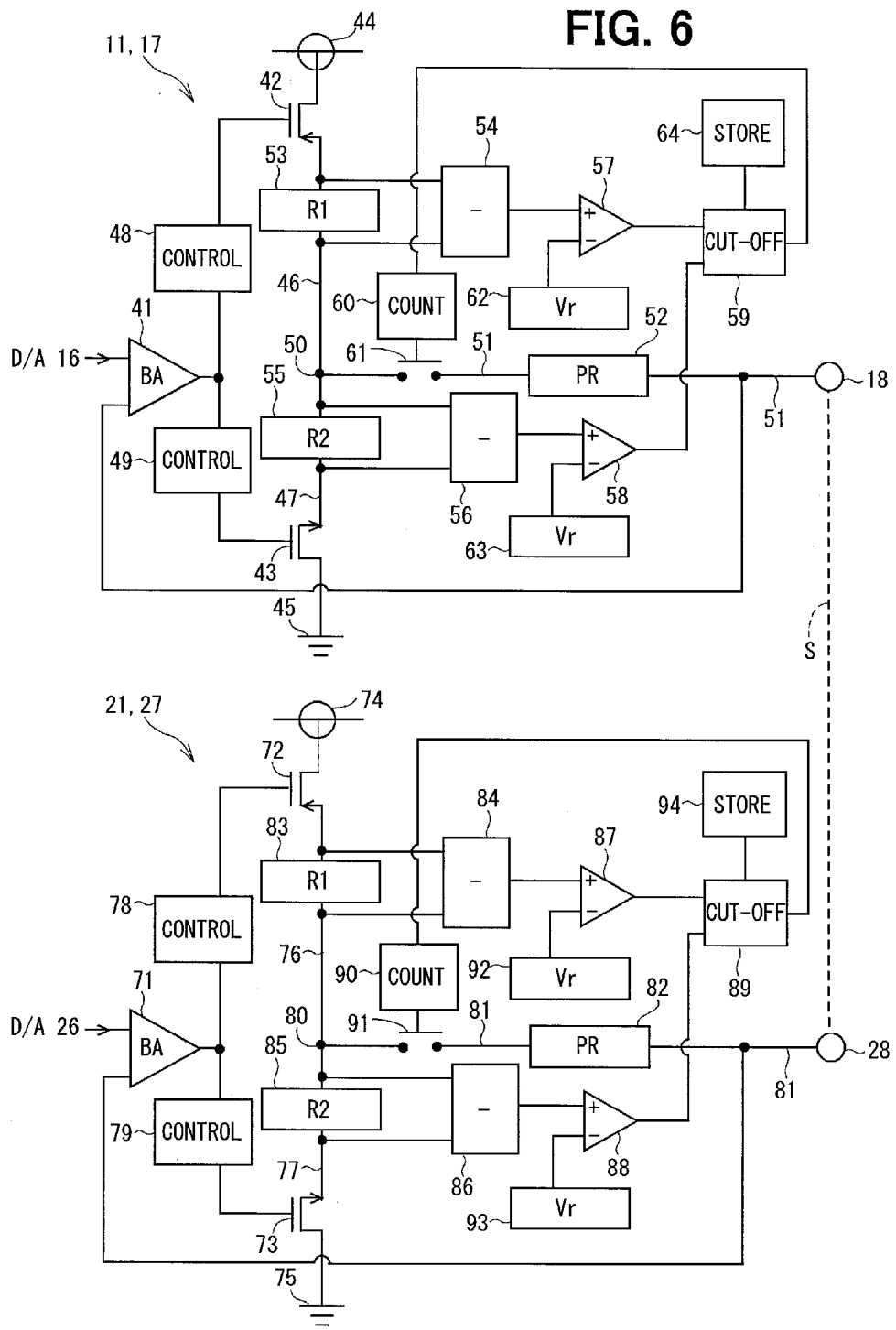
FIG. 6 is a wiring diagram illustrating an output circuit in the position detecting device according to the first embodiment.

The integrated circuits 11 and 21 include therein storage units (memories) 64 and 94, respectively, as shown in FIG. 6. The storage units 64 and 94 store information on whether the ECU 30 uses the voltage signal V1 of the positive characteristic as the control signal or uses the voltage signal V2 of the negative characteristic as the control signal therein as shown in FIG. 5. When the ECU 30 uses the voltage signal V1 of the positive characteristic as the control signal, "0" is stored as a factory write bit (output designation bit) in the storage units 64 and 94 of the integrated circuits 11 and 21. On the other hand, when the ECU 30 uses the voltage signal V2 of the negative characteristic as the control signal, "1" is stored as the factory write bit in the storage units 64 and 94 of the integrated circuits 11 and 21.

The ECU 30 uses the voltage signal V1 of the positive characteristic as the control signal for driving the motor 9. For this reason, the factory write bit is set to "0" in the respective storage units 64 and 94 of the integrated circuits 11 and 21 provided in the position detecting device 10 shown FIG. 6.

As shown in detail in FIG. 6, the integrated circuits 11 and 21 include output circuits 17 and 27. The integrated circuit 11 outputs the voltage signal V1 of the positive characteristic used by the ECU 30 as the control signal. Second integrated circuit 21 outputs the voltage signal V2 of the negative characteristic used by the ECU 30 as the monitor signal.

Since the two output circuits 17 and 27 are substantially identical with each other, only the output circuit 17 of the integrated circuit 11 will be described.

A signal output from the D/A converter 16 is input to a buffer amplifier 41. The buffer amplifier 41 buffers and amplifies the input signal to remove a mutual influence with a circuit of the ECU 30.

A power side transistor 42 and a ground side transistor 43 are connected in series with signal lines 46 and 47 that connect a power supply 44 (for example, 5 V) and a ground 45 (0 V), respectively.

One control circuit 48 controls a resistance value of the power side transistor 42, and the other control circuit 49 controls a resistance value of the ground side transistor 43, on the basis of a signal output from the buffer amplifier 41. The control circuits 48 and 49 control the resistance value of the ground side transistor 43 to decrease as the resistance value of the power side transistor 42 increases. As a result, a voltage at a connection point 50 between the power side transistor 42 and the ground side transistor 43 is adjusted.

Also, the integrated circuit 11 outputs the signal of the positive characteristic for a control operation, and the integrated circuit 21 outputs the signal of the negative characteristic for a monitor operation. Therefore, a resistance value of a power side transistor 72 in the integrated circuit 21 decreases as a resistance value of the power side transistor 42 in the integrated circuit 11 increases. Also, a resistance value of a ground side transistor 73 in the integrated circuit 21 decreases as a resistance value of the ground side transistor 43 in the integrated circuit 11 increases.

An output signal line 51 connects the connection point 50 and the output terminal 18. Accordingly, a voltage signal of the connection point 50 corresponding to the voltage signal output from the buffer amplifier 41 is transmitted to the ECU 30 from the output terminal 18 through the output signal line 51.

A protective resistor 52 is disposed in the output signal line 51. When an abnormal voltage is applied to the output terminal 18, the protective resistor 52 protects the power side transistor 42, the ground side transistor 43, and the control circuits 48, 49.

It is noted in the first embodiment that a circuit is provided to output a signal enabling the ECU 30 to control the vehicle to be safe from the position detecting device 10 to the ECU 30 in a failure state where the output terminals 18 and 28 of the two integrated circuits 11 and 21 are short-circuited as shown by a dotted line S in FIG. 6. Hereinafter, this circuit will be described.

The output circuit 17 includes a first resistor 53, a first subtractor circuit 54, a second resistor 55, a second subtractor circuit 56, a first comparator circuit 57, a second comparator circuit 58, a cutoff circuit 59, a counter circuit 60, and a switch 61.

The first resistor 53 is disposed in the signal line 46 between the power supply 44 and the connection point 50. The first subtractor circuit 54 calculates a potential difference (voltage) between both ends of the first resistor 53. The potential difference between the both ends of the first resistor 53 is proportional to a current flowing into the signal line 46 between the power supply 44 and the connection point 50. The first resistor 53 and the first subtractor circuit 54 are provided as a power side current detector circuit.

The second resistor 55 is disposed in the signal line 47 between the connection point 50 and the ground 45. The second subtractor circuit 56 calculates a potential difference (voltage) between both ends of the second resistor 55. The potential difference between the both ends of the second resistor 55 is proportional to a current flowing into the signal line 47 between the connection point 50 and the ground 45. The second resistor 55 and the second subtractor circuit 56 are provided as a ground side current detector circuit.

The first comparator circuit 57 compares a voltage output from the first subtractor circuit 54 with a first reference voltage Vr1 provided by a first reference voltage source 62. The second comparator circuit 58 compares a voltage output from the second subtractor circuit 56 with a second reference voltage Vr2 provided by a second reference voltage source 63. The reference voltages Vr1 and Vr2 are set to the same voltages as the voltages output from the first subtractor circuit 54 and the second subtractor circuit 56 in the normal state, respectively. Since a sum of the resistance values of the power side transistor 42 and the resistance value of the ground side transistor 43 is kept constant under the control, a normal current value flowing from the power supply 44 into the ground 45 in the normal state is kept constant.

The first comparator circuit 57 outputs a signal "0" when the voltage output from the first subtractor circuit 54 is smaller than the reference voltage Vr1. The first comparator circuit 57 outputs a signal "1" when the voltage output from the first subtractor circuit 54 is larger than the reference voltage Vr1. That is, the first comparator circuit 57 outputs the signal "1" when the current flowing from the power supply 44 into the connection point 50 is larger than the normal current value flowing from the power supply 44 into the ground 45 in the normal state. The signal "1" output by the first comparator circuit 57 is a first abnormal signal.

The second comparator circuit 58 outputs a signal "0" when the voltage output from the second subtractor circuit 56 is smaller than the reference voltage Vr2. The second comparator circuit 58 outputs a signal "1" when the voltage output from the second subtractor circuit 56 is larger than the reference voltage Vr2. That is, the second comparator circuit 58 outputs the signal "1" when the current flowing from the connection point 50 into the ground 45 is larger than the normal current value flowing from the power supply 44 into the ground 45 in the normal state. The signal "1" output by the second comparator circuit 58 is a second abnormal signal.

The cutoff circuit 59 detects whether the ECU 30 uses the voltage signal V1 of the positive characteristic, or the voltage signal V2 of the negative characteristic, for control of the throttle valve 4 in the normal state, according to the factory write bit stored in the storage unit 64.

The cutoff circuit 59 detects that the ECU 30 uses the voltage signal V1 of the positive characteristic for the control in the normal state, according to the factory write bit "0" stored in the storage unit 64.

In this case, when the signal "1" is output from the second comparator circuit 58, the cutoff circuit 59 turns off the switch 61 disposed in the output signal line 51, and cuts off the conduction of the output signal line 51. The switch 61 is, for example, a semiconductor switch formed of an FET, or a mechanical switch.

Also, when the signal "1" is output from the second comparator circuit 58, the cutoff circuit 59 operates the counter circuit 60. In this situation, the counter circuit 60 periodically renders the output signal line 51 cut off by the switch 61 conductive by periodically turning on the switch 61. This is because a state in which the signal "1" is output from the first comparator circuit 57, and a state in which the signal "1" is output from the second comparator circuit 58 may be replaced with each other according to the opening angle of the throttle valve 4, in the failure state where the output terminals 18 and 28 of the two integrated circuits 11 and 21 are short-circuited. The cutoff circuits 59, 89 and the switches 61, 91 are provided as a cutoff unit.

Figure 7:
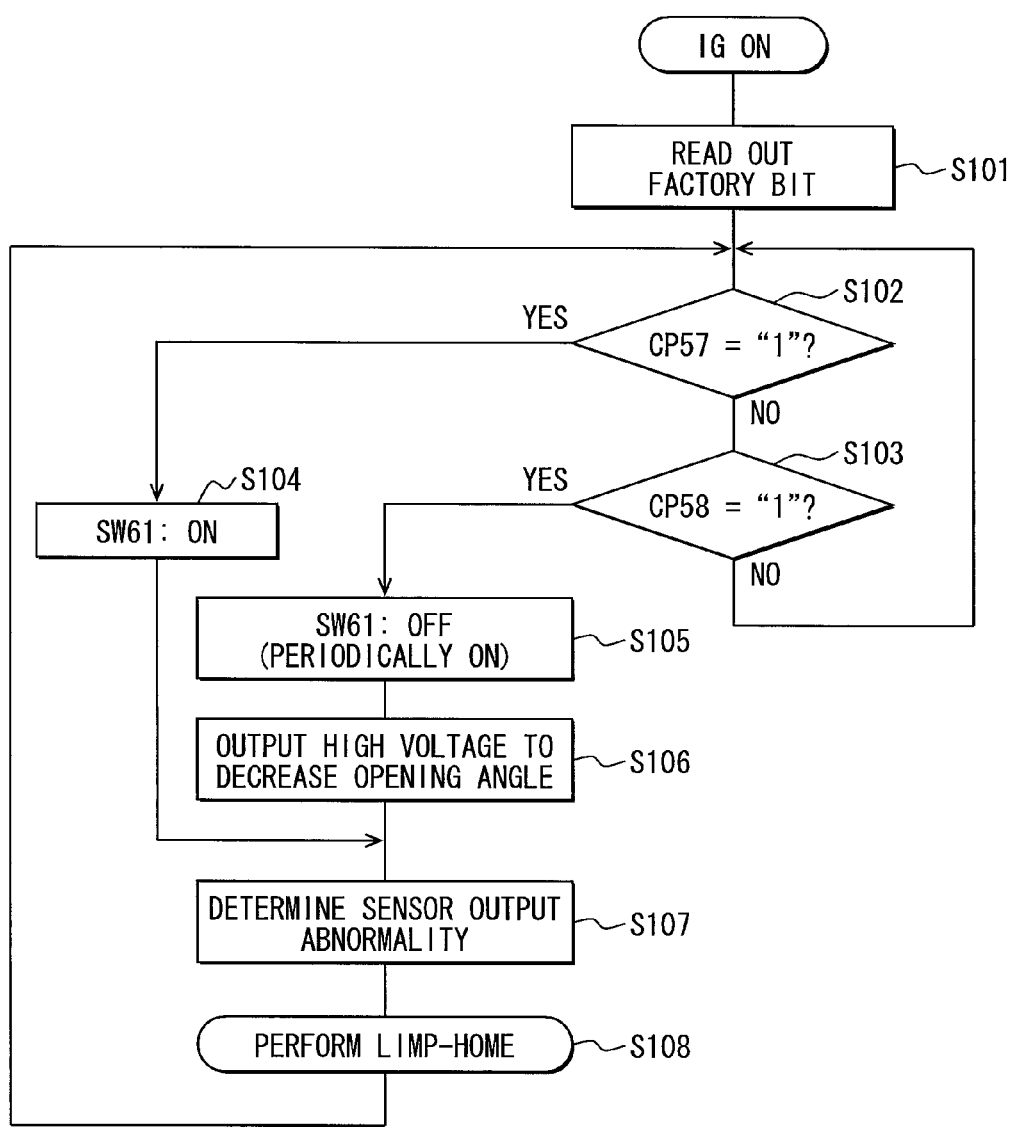
FIG. 7 is a flowchart illustrating processing in a failure state of the position detecting device according to the first embodiment.

Subsequently, processing in the failure state of the position detecting device 10 will be described with reference to FIGS. 7 and 8.

The failure detection processing is described as processing of the integrated circuit 11, but substantially the same processing is also executed in the integrated circuit 21.

The failure detection processing starts when an ignition switch (IG) for the vehicle turns on.

The factory write bit stored in the storage unit 64 is read out in S101. In this embodiment, since the factory write bit "0" is stored in the storage unit 64, it is detected that the ECU 30 uses the voltage signal V1 of the positive characteristic as the signal for control operation of the throttle valve 4.

Figures 8, 9:
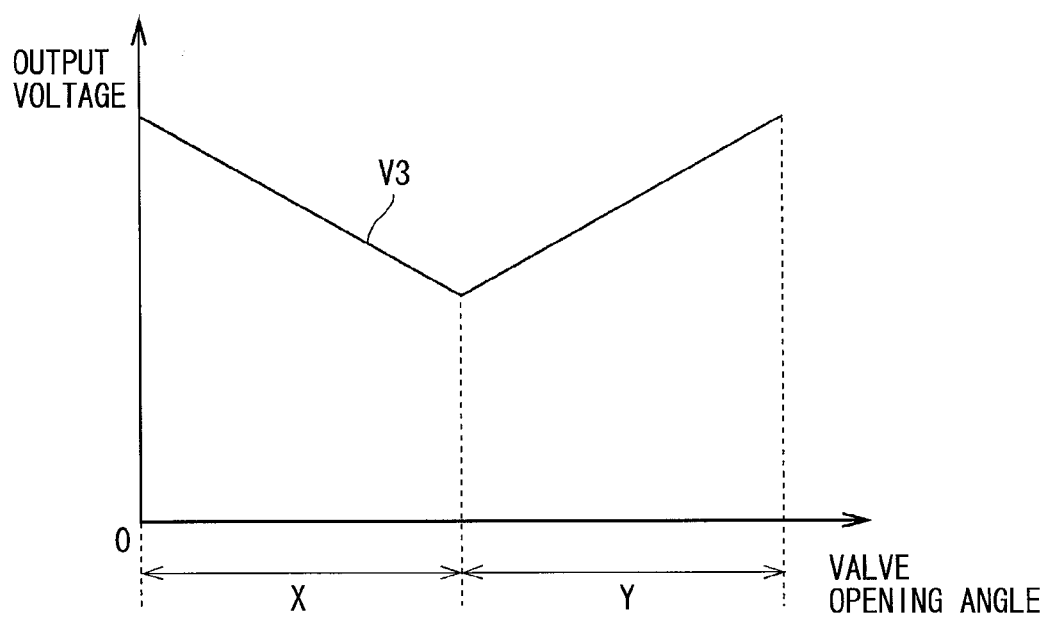
FIG. 8 is a table showing the operation of a cutoff circuit in the position detecting device according to the first embodiment.
FIG. 9 is a characteristic diagram illustrating an output signal in the failure state of the position detecting device according to the first embodiment.

In this case, a data map illustrated in FIG. 8 is selected in a relationship between the signal of the first comparator circuit 57 or the signal of the second comparator circuit 58, and the on/off of the switch 61 that is controlled by the cutoff circuit 59.

The output signal CP57 of the first comparator circuit 57 is detected and checked in S102. When the signal "0" is output from the first comparator circuit 57, the processing proceeds to S103.

The output signal CP58 of the second comparator circuit 58 is detected and checked in S103. When the signal "0" is output from the second comparator circuit 58, the processing returns to S102, and the processing in S102 and S103 is repetitively executed.

When the signal "1" is output from the first comparator circuit 57 in the processing of S102, the processing proceeds to S104. The output signal line 51 is rendered conductive while the switch 61 is kept on based on the data map of FIG. 8 in S104.

That is, when the opening angle of the throttle valve is in an area Y of FIG. 4, the voltage at the connection point 50 in the integrated circuit 11 is higher than a voltage at a connection point 80 of the integrated circuit 21. In this case, a resistance value of the power side transistor 42 in the integrated circuit 11, and a resistance value of the ground side transistor 73 in the integrated circuit 21 are smaller than a resistance value of the ground side transistor 43 in the integrated circuit 11, and a resistance value of the power side transistor 72 in the integrated circuit 21. For this reason, a current passes through the connection point 50, and the output terminals 18 and 28 from the power supply 44 of the integrated circuit 11, and is discharged from the connection point 80 of the integrated circuit 21 to a ground 75. Accordingly, when the signal "1" is output from the first comparator circuit 57, the voltage at the connection point 50 of the integrated circuit 11 is higher than the voltage at the connection point 80 of the integrated circuit 21. Therefore, the cutoff circuit 59 of the integrated circuit 11 keeps the switch 61 of the output signal line 51 on.

In this case, in the integrated circuit 21, the signal "1" is output from the second comparator circuit 58. Since the current is drawn into the integrated circuit 21, the cutoff circuit 59 of the integrated circuit 21 turns off the switch 61 of the output signal line 51. As a result, the area Y in FIG. 9 illustrates the ECU 30 controls the opening angle of the throttle valve 4 according to a signal V3 output from the integrated circuit 11.

On the other hand, when the signal "1" is output from the second comparator circuit 58 in the processing of S103, the processing proceeds to S105.

The switch 61 turns off on the basis of the data map in FIG. 8 in S105, to cut off the conduction of the output signal line 51.

That is, when the valve opening angle is in an area X of FIG. 4, the voltage at the connection point 50 in the integrated circuit 11 is lower than the voltage at the connection point 80 of the integrated circuit 21. In this situation, the resistance value of the power side transistor 72 in the integrated circuit 21, and the resistance value of the ground side transistor 43 in the integrated circuit 11 are smaller than the resistance value of the ground side transistor 73 in the integrated circuit 21, and the resistance value of the power side transistor 42 in the integrated circuit 11. For this reason, a current passes through the connection point 80 and the output terminals 28 and 18 from a power supply 74 of the integrated circuit 21, and flows into the ground 45 from the connection point 50 of the integrated circuit 11. That is, the current is drawn into the integrated circuit 11. Accordingly, when the signal "1" is output from the second comparator circuit 58, the voltage at the connection point 50 of the integrated circuit 11 is lower than the voltage at the connection point 80 of the integrated circuit 21. Therefore, the cutoff circuit 59 in the integrated circuit 11 turns off the switch 61 of the output signal line 51. Then, an output voltage of the integrated circuit 21 is output to the ECU 30. For this reason, the area X of FIG. 9 illustrates that the ECU 30 controls the opening angle of the throttle valve 4 according to the signal V3 output from the integrated circuit 21.

The signal output from the position detecting device 10 to the ECU 30 is changed from the voltage in the area X in FIG. 4 to a voltage in the area X of FIG. 9 in S106. The operation of the ECU 30 in this case will be described with reference to FIG. 10.

Figure 10:
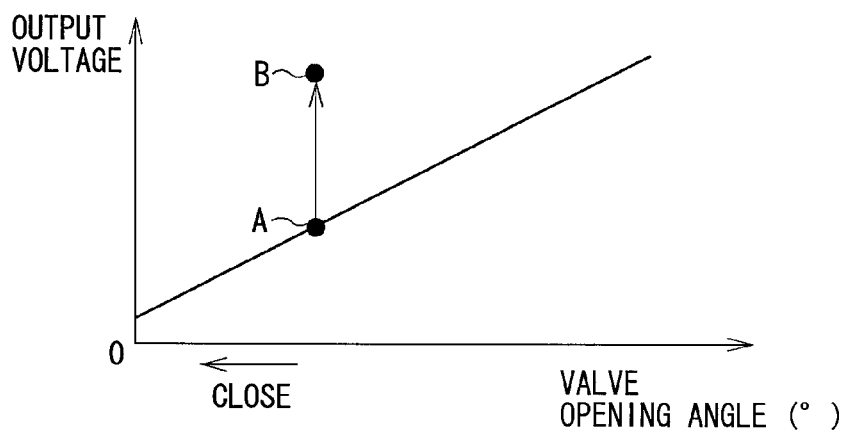
FIG. 10 is a characteristic diagram illustrating the behavior of an ECU in the failure state of the position detecting device according to the first embodiment.

In the case of the ECU 30 that controls the opening angle of the throttle valve 4 according to the output voltage of the positive characteristic, when the voltage increases so as to shift from a point A to a point B in FIG. 10, the ECU 30 determines that the opening angle of the throttle valve 4 is larger than a target opening angle of the throttle valve 4. For this reason, the ECU 30 drives the motor 9 so as to decrease the opening angle of the throttle valve 4 for the purpose of bringing the opening angle of the throttle valve 4 close to the target opening angle of the throttle valve 4. As a result, the ECU 30 controls the vehicle to be safe according to the signal V3 of the position detecting device 10.

The ECU 30 determines, in S107, that the output terminals 18 and 28 of the integrated circuits 11 and 21 in the position detecting device 10 are short-circuited. For this reason, the ECU 30 allows the vehicle to retreat (limp-home travel) in S108.

In the failure state where the output terminals 18 and 28 of the two integrated circuits 11 and 21 are short-circuited, the opening angle of the throttle valve 4 may move between the area X and the area Y of FIG. 9. For this reason, the counter circuit 60 periodically turns on the switch 61 of the output signal line 51 in S105 to periodically render the output signal line 51 cut off by the cutoff circuit 59 conductive. As a result, when the state in which the signal "1" is output from the first comparator circuit 57, and the state in which the signal "1" is output from the second comparator circuit 58 are replaced with each other, the position detecting device 10 can output the output of the integrated circuit having the higher output voltage to the ECU 30.

The first embodiment provides the following functional advantages.

(1) When the ECU 30 controls the opening angle of the throttle valve 4 on the basis of the output signal of the integrated circuit of the positive characteristic, the cutoff circuit 59 cuts off the conduction of the output signal line 51 if the signal "1" is output from the second comparator circuit 58.

When the output terminals 18 and 28 of the two integrated circuits 11 and 21 are short-circuited, and the signal "1" is output from the second comparator circuit 58, since the current is drawn in that integrated circuit, the output voltage of that integrated circuit is smaller than the output voltage of the other integrated circuit. For this reason, if the conduction of the output signal line of that integrated circuit is cut off, the output voltage of the other integrated circuit is output to the ECU 30. In this situation, the ECU 30 determines that the opening angle of the throttle valve 4 is larger than the target opening angle, and controls the opening angle of the throttle valve 4 to be smaller so as to come close to a target position. As a result, the ECU 30 can control the vehicle to be safe.

(2) The position detecting device 10 includes the storage unit 64 that stores the factory write bit "0" or "1". As a result, the position detecting device 10 can more surely determine whether the ECU 30 uses the output signal of the positive characteristic, or the output signal of the negative characteristic, for control of the throttle valve 4, according to the factory write bit "0" or "1".

(3) The position detecting device 10 includes the counter circuits 60 and 90 that render the cutoff of the output signal lines 51 and 81 by the switches 61 and 91 conductive at given time intervals when the signal "1" is output from the second comparator circuits 58 and 88.

The integrated circuits that can output the signal for controlling the vehicle to be safe may be replaced with each other by changing the opening angle of the throttle valve 4 with time. For this reason, when the output terminals 18 and 28 of the plural integrated circuits 11 and 21 are short-circuited, the counter circuits 60 and 90 render the cutoff of the output signal lines 51 and 81 by the switches 61 and 91 conductive at the given time intervals. Therefore, the ECU 30 can determine which integrated circuit can output the signal for controlling the vehicle to be safe. As a result, the ECU 30 can always control the vehicle to be safe.

(Second Embodiment)

Figure 11:
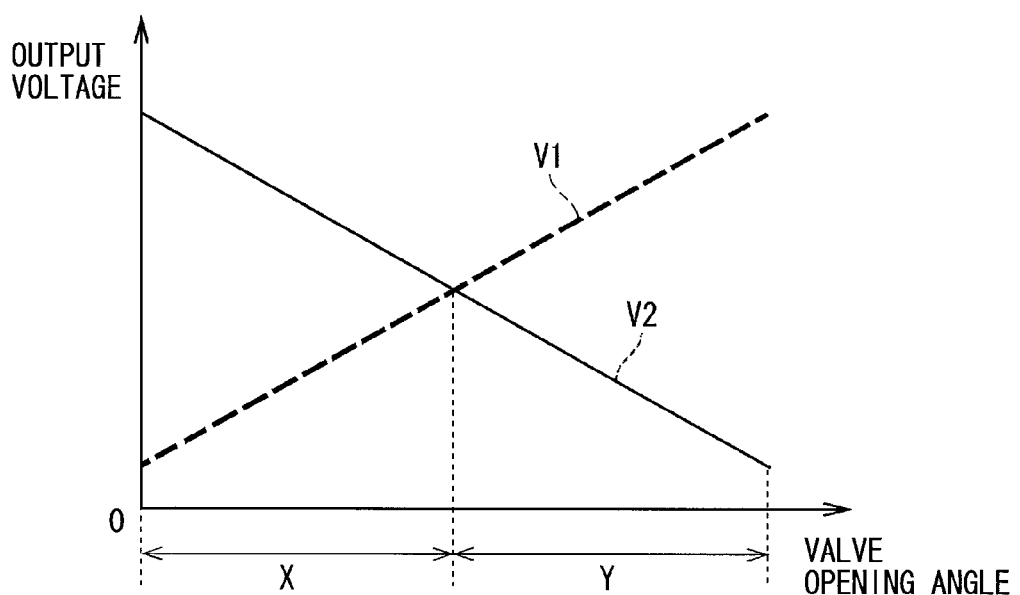
FIG. 11 is a characteristic diagram illustrating an output signal of a position detecting device according to a second embodiment.

A position detecting device according to a second embodiment is illustrated in FIGS. 11 to 16. In the second embodiment, the position detecting device 10 is configured to have a characteristic of a signal output to the ECU 30 in the normal state as shown in FIG. 11.

In the second embodiment, in the normal state, the ECU 30 uses the voltage signal V2 of the negative characteristic output from the second integrated circuit 21 as the control signal for driving the motor 9. Also, the ECU 30 uses the voltage signal V1 of the positive characteristic output from first integrated circuit 11 as a monitor signal for monitoring operation states of the two integrated circuits 11 and 21. That is, the integrated circuit for control operation and the integrated circuit for monitor operation in the first embodiment are replaced with each other.

For this reason, in the second embodiment, the factory write bit is set to "1" and stored in both of the storage units 64 and 94 of the two integrated circuits 11 and 21 10. The factory write bit "1" indicates that the ECU 30 uses the voltage signal V2 of the negative characteristic as the control signal.

Figure 12:
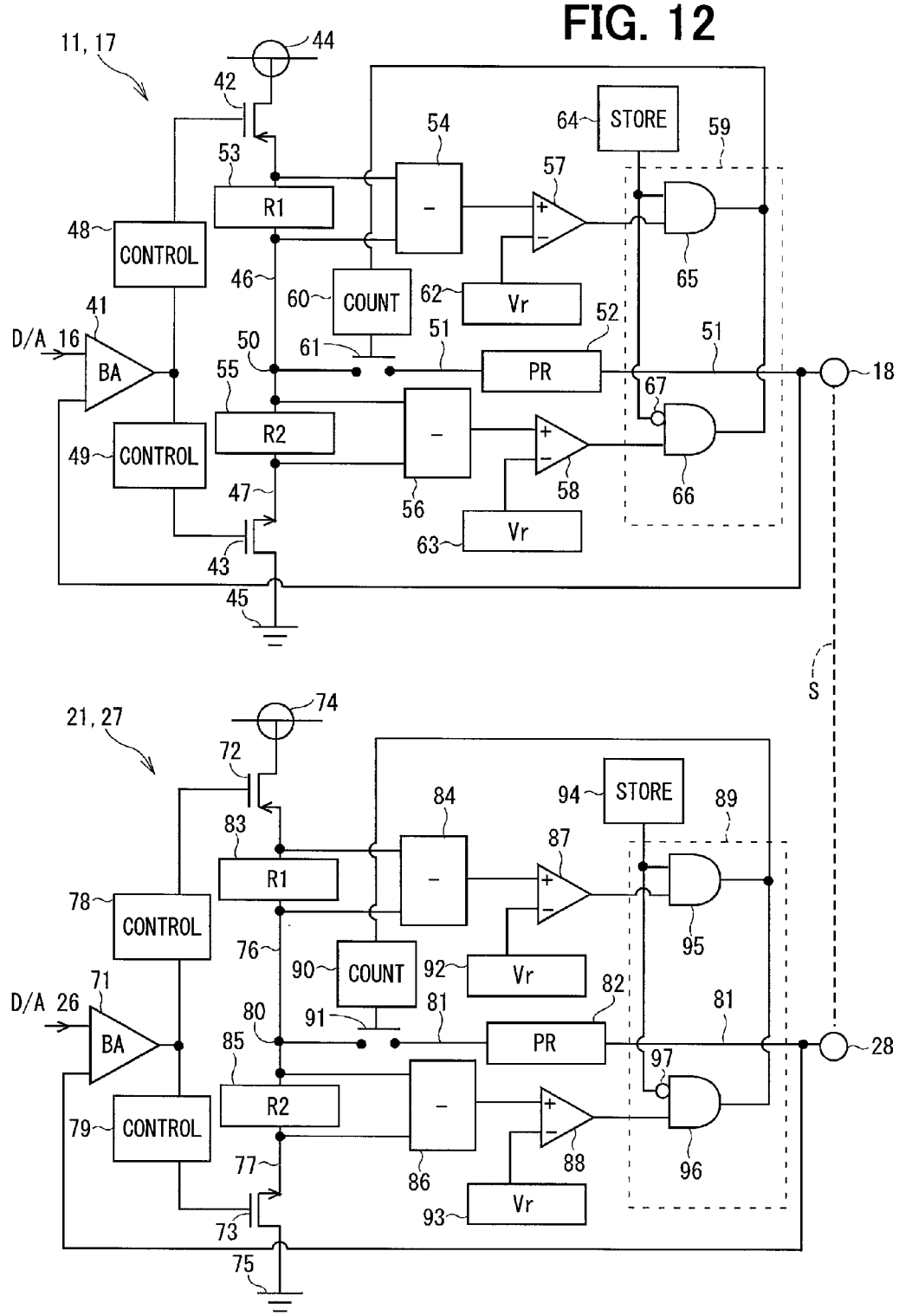
FIG. 12 is a wiring diagram illustrating an output circuit in the position detecting device according to the second embodiment.

The output circuits 17 and 27 of the two integrated circuits 11 and 21 are illustrated in FIG. 12. Since the two output circuits 17 and 27 are substantially identical in configuration with each other, only the output circuit 27 of the integrated circuit 21 for control operation will be described.

FIG. 12 illustrates a detailed example of the cutoff circuit 89 shown in FIG. 6. The cutoff circuit 89 includes a first AND circuit 95, a second AND circuit 96, and an inverter circuit 97.

Only when "1" is output from the storage unit 94, and the signal "1" is output from a first comparator circuit 87, the first AND circuit 95 operates the counter circuit 90, turns off the switch 91, and cuts off the conduction of the output signal line 81.

A signal output from the storage unit 94 is inverted by the inverter circuit 97 and input to the second AND circuit 96. Only when "0" is output from the storage unit 94, and the signal "1" is output from the first comparator circuit 87, the second AND circuit 96 operates the counter circuit 90, turns off the switch 91, and cuts off the conduction of the output signal line 81.

Subsequently, the processing when the position detecting device is in failure will be described with reference to FIG. 13.

The failure detection processing is described as processing of the integrated circuit 21 for control operation, but substantially the same processing is also executed in the integrated circuit 11 for monitor operation.

The failure detection processing starts when an ignition switch for the vehicle turns on.

The factory write bit stored in the storage unit 94 is read out in S201. Since the factory write bit "1" is stored in the storage unit 94, it is detected that the ECU 30 uses the voltage signal V2 of the negative characteristic as the signal for control operation of the throttle valve 4. In this case, a data map illustrated in FIG. 14 is selected in a relationship between the signal CP87 of the first comparator circuit 87 or the signal CP88 of the second comparator circuit 88, and the on/off of the switch 91 that is controlled by the cutoff circuit 89.

When the signal "0" is output from the first comparator circuit 87, and the signal "0" is output from the second comparator circuit 88 in S202 and S203, respectively, the processing in S202 and S203 is repetitively executed.

When the signal "1" is output from the first comparator circuit 87 in the processing of S202, the processing proceeds to S204.

Figures 13, 14:
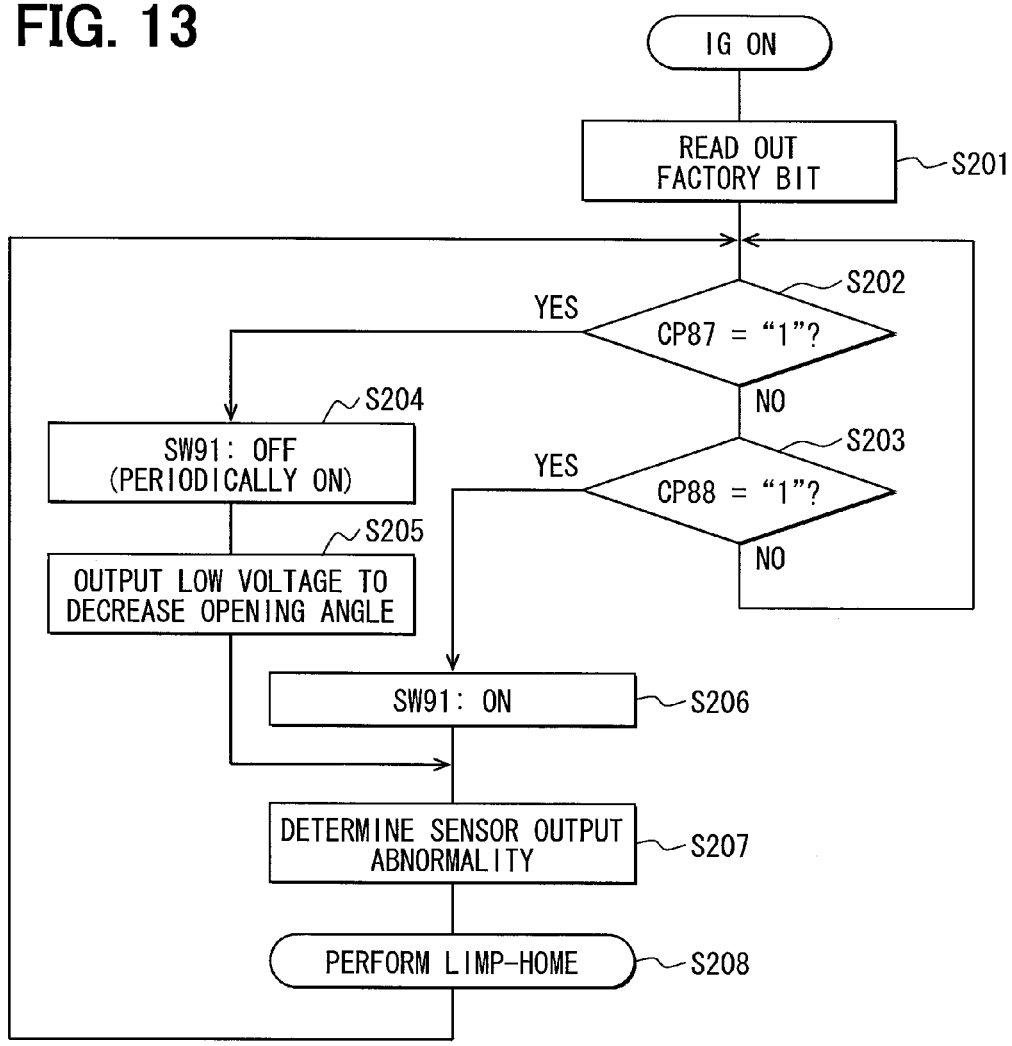
FIG. 13 is a flowchart illustrating processing in a failure state of the position detecting device according to the second embodiment.
FIG. 14 is a table showing the operation of a cutoff circuit in the position detecting device according to the second embodiment.

The switch 91 turns off on the basis of the map of FIG. 14 in S204, to cut off the conduction of the output signal line 81.

That is, when the opening angle of the throttle valve 4 is in an area X of FIG. 11, the voltage at the connection point 80 in the integrated circuit 21 is higher than a voltage at the connection point 50 of the integrated circuit 11. In this case, a resistance value of the power side transistor 72 in the integrated circuit 21, and a resistance value of the ground side transistor 43 in the integrated circuit 11 are smaller than a resistance value of the ground side transistor 73 in the integrated circuit 21, and a resistance value of the power side transistor 42 in the integrated circuit 11. For this reason, a current passes through the connection point 80 and the output terminals 28, 18 from the power supply 74 of the integrated circuit 21, and flows from the connection point 50 of the integrated circuit 11. That is, the current is discharged from the integrated circuit 21. Accordingly, when the signal "1" is output from the first comparator circuit 83, the voltage at the connection point 80 of the integrated circuit 21 is higher than the voltage at the connection point 50 of the integrated circuit 11. Therefore, the cutoff circuit 89 of the integrated circuit 21 turns off the switch of the output signal line 81. As a result, the voltage signal V1 of the integrated circuit 11 is output to the ECU 30. For this reason, the area X in FIG. 15 indicates that the ECU 30 controls the opening angle of the throttle valve 4 according to the signal V4 output from the integrated circuit 11.

Figure 15:
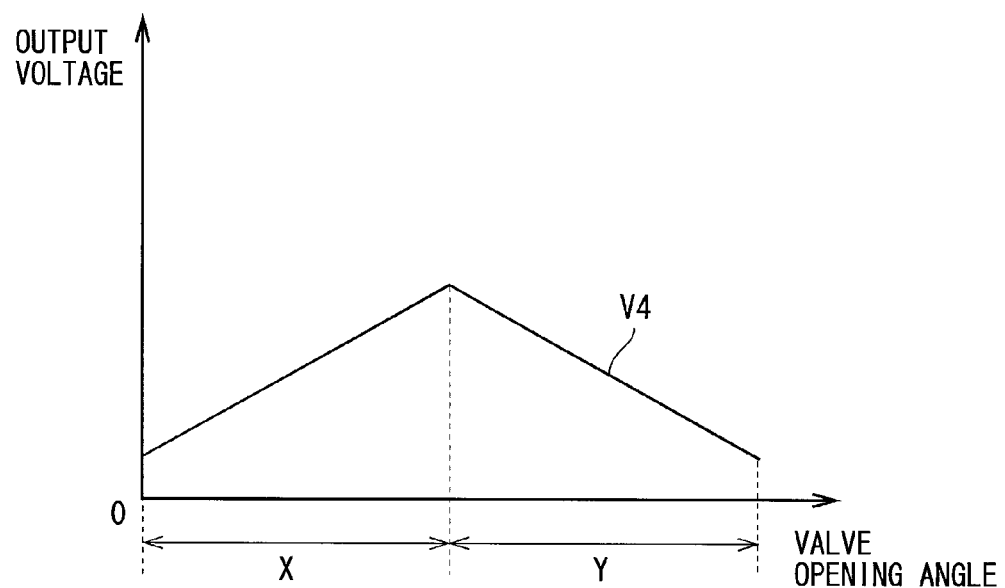
FIG. 15 is a characteristic diagram illustrating an output signal in the failure state of the position detecting device according to the second embodiment.

The signal output from the position detecting device from the ECU 30 is changed from the voltage of the area X in FIG. 11 to the voltage of the area X in FIG. 15 in S205. In this situation, the operation of the ECU 30 will be described with reference to FIG. 16.

Figure 16:
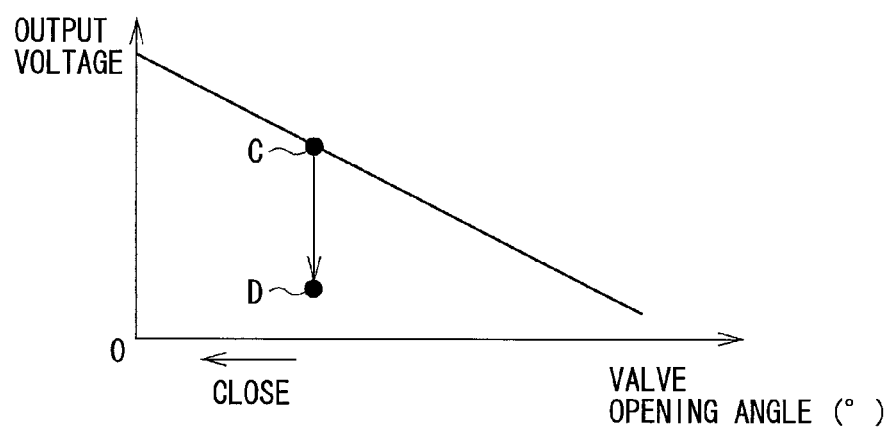
FIG. 16 is a characteristic diagram illustrating the behavior of an ECU in the failure state of the position detecting device according to the second embodiment.

In the case of the ECU 30 that controls the opening angle of the throttle valve 4 according to the output voltage of the negative characteristic, when the voltage signal decreases so as to shift from a point C to a point D in FIG. 16, the ECU 30 determines that the opening angle of the throttle valve 4 is larger than a target opening angle of the throttle valve 4. For this reason, the ECU 30 drives the motor 9 so as to decrease the opening angle of the throttle valve 4 for the purpose of bringing the opening angle of the throttle valve 4 close to the target opening angle of the throttle valve 4. As a result, the ECU 30 controls the vehicle to be safe according to the signal V4 of the position detecting device.

In the failure state where the output terminals 18 and 28 of the two integrated circuits 11 and 21 are short-circuited, the opening angle of the throttle valve 4 may move between the area X and the area Y of FIG. 15. For this reason, the counter circuit 90 periodically turns on the switch 91 of the output signal line 81 in S205 to periodically render the output signal line 81 cut off by the switch 91 conductive. As a result, when the state in which the signal "1" is output from the first comparator circuit 87, and the state in which the signal "1" is output from the second comparator circuit 88 are replaced with each other, the position detecting device can output the output of the integrated circuit having the lower output voltage to the ECU 30.

On the other hand, if the signal "1" is output from the second comparator circuit 88 in the processing of S203, the processing proceeds to S206.

The output signal line 81 is rendered conductive while keeping the switch 91 on, on the basis of the data map of FIG. 14 in S206.

That is, when the opening angle of the throttle valve 4 is in an area Y of FIG. 11, the voltage at the connection point 80 in the integrated circuit 21 is lower than a voltage at the connection point 50 of the integrated circuit 11. In this case, a resistance value of the power side transistor 42 in the integrated circuit 11 and a resistance value of the ground side transistor 73 in the integrated circuit 21 are smaller than a resistance value of the ground side transistor 43 in the integrated circuit 11 and a resistance value of the power side transistor 72 in the integrated circuit 21. For this reason, a current passes through the connection point 50, and the output terminals 18 and 28 from the power supply 44 of the integrated circuit 11, and flows from the connection point 80 of the integrated circuit 21 to the ground 75. That is, the current is drawn into the integrated circuit 21. Accordingly, when the signal "1" is output from the second comparator circuit 88, the voltage at the connection point 80 of the integrated circuit 21 is lower than the voltage at the connection point 50 of the integrated circuit 11. Therefore, the cutoff circuit 89 of the integrated circuit 21 keeps the switch 91 of the output signal line 81 on.

In this case, in the integrated circuit 11, since the signal "1" is output from the first comparator circuit 57, the switch 61 of the output signal line 51 turns off. As a result, an area Y in FIG. 15 illustrates that the ECU 30 controls the opening angle of the throttle valve 4 according to a signal V4 output from the integrated circuit 21.

The ECU 30 determines that the output terminals 18 and 28 of the integrated circuits 11 and 21 in the position detecting device are short-circuited in S207. For this reason, the ECU 30 retreats the vehicle in S208.

In the second embodiment, when the ECU 30 controls the opening angle of the throttle valve 4 on the basis of the output signal of the integrated circuit 21 of the negative characteristic, if the signal "1" is output from the first comparator circuit 87, the cutoff circuit 89 cuts off the conduction of the output signal line 81.

When the output terminals 18 and 28 of the two integrated circuits 11 and 21 are short-circuited, and the signal "1" is output from the first comparator circuit, since the current is discharged from that integrated circuit, the output voltage of the integrated circuit is larger than the output voltage of the other integrated circuit. For this reason, if the conduction of the output signal line of that integrated circuit is cut off, the output voltage of the other integrated circuit is output to the ECU 30. In this situation, the ECU 30 determines that the opening angle of the throttle valve 4 is larger than the target opening angle, and controls the opening angle of the throttle valve 4 to be smaller so as to come close to a target position. As a result, the ECU 30 can control the vehicle to be safe.

(Third Embodiment)

Figure 17:
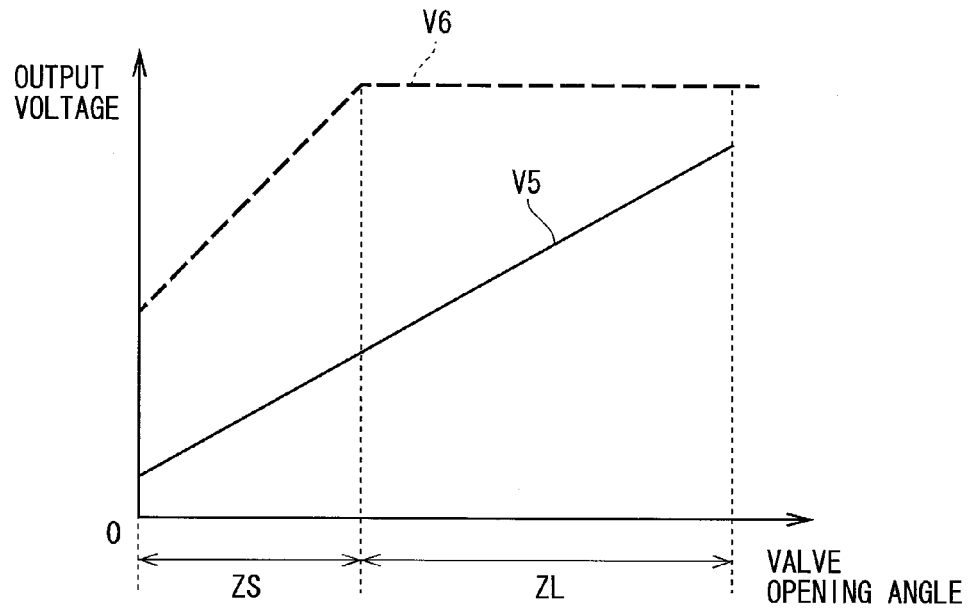
FIG. 17 is a characteristic diagram illustrating an output signal of a position detecting device according to a third embodiment.
Figure 18:
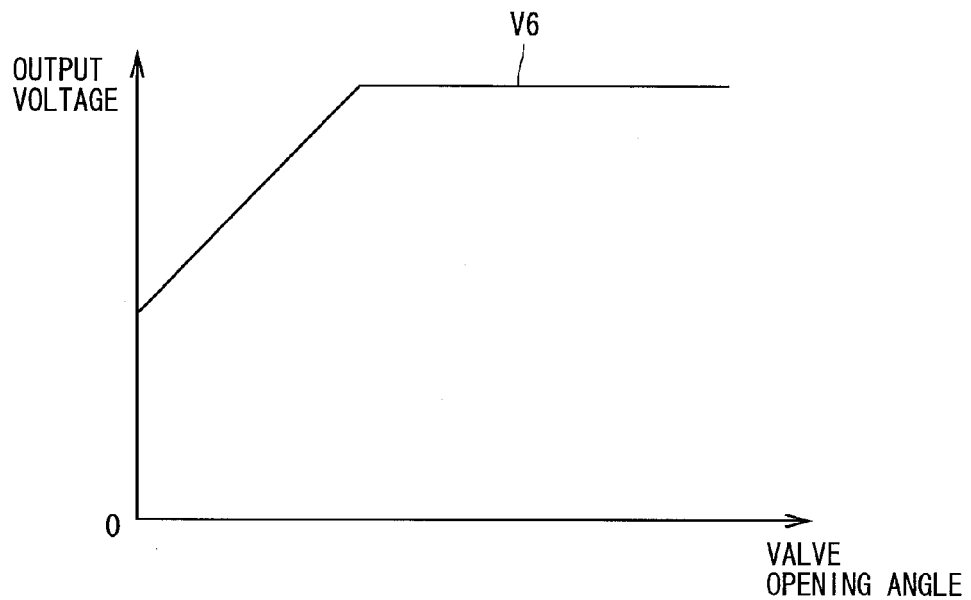
FIG. 18 is a characteristic diagram illustrating an output signal in a failure state of the position detecting device according to the third embodiment.

A position detecting device according to a third embodiment is illustrated in FIGS. 17 and 18.

A characteristic of a signal output by the position detecting device of the third embodiment to the ECU 30 in the normal state is illustrated in FIG. 17.

In the third embodiment, in the normal state, the ECU 30 uses a voltage signal V5 of the positive characteristic output from one integrated circuit as a control signal for driving the motor 9. Therefore, the factory write bit is stored as "0" in both of the storage units 64 and 94 of the two integrated circuits 11 and 21.

Also, the ECU 30 uses a voltage signal V6 output from the other integrated circuit as a monitoring signal for monitoring the operation states of the two integrated circuits 11 and 21.

The voltage signal V6 output from the integrated circuit for monitor operation is large in a change of an area ZS smaller in the opening angle of the throttle valve 4. As a result, the ECU 30 can precisely monitor the opening angle of the throttle valve 4 when a change in the quantity of air sucked into the cylinder of the internal combustion engine is large.

Since the voltage signal V6 of the integrated circuit for monitor operation is always higher than the voltage signal V5 of the integrated circuit for control operation. Therefore, when the output terminals 18 and 28 of the two integrated circuits 11 and 21 are short-circuited, the signal "1" is output from the second comparator circuit in the integrated circuit for control operation. In this case, the cutoff circuit of the integrated circuit for control turns off the switch of the output signal line. As a result, FIG. 18 illustrates that the ECU 30 controls the opening angle of the throttle valve 4 according to the voltage signal V6 output from the integrated circuit for monitor operation. As a result, the ECU 30 controls the vehicle to be safe according to the voltage signal V6 of the position detecting device.

In the third embodiment, since the signal output from the integrated circuit for control operation is always lower than the signal output from the integrated circuit for monitor operation regardless of the opening angle of the throttle valve 4, the counter circuit may not be installed.

(Fourth Embodiment)

Figure 19:
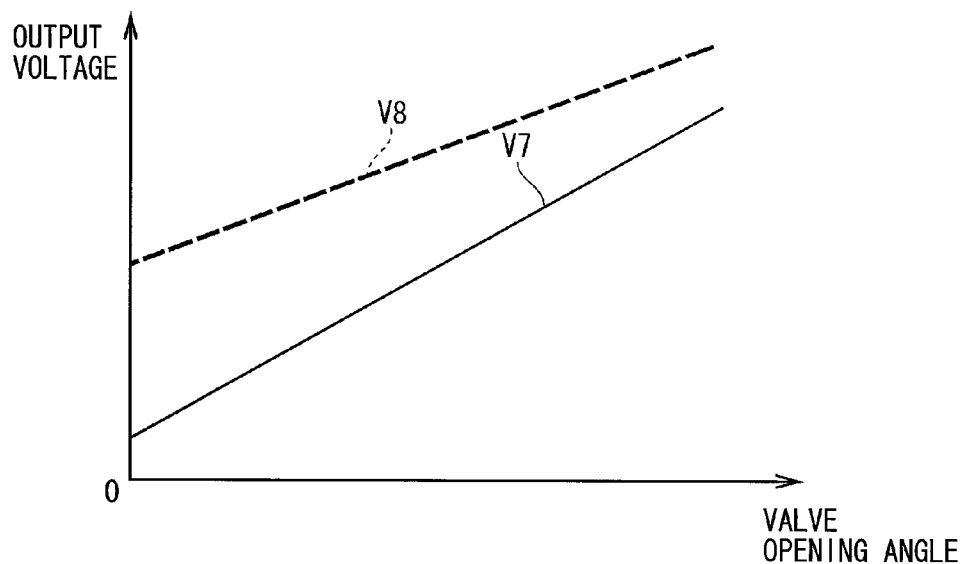
FIG. 19 is a characteristic diagram illustrating an output signal of a position detecting device according to a fourth embodiment.
Figure 20:
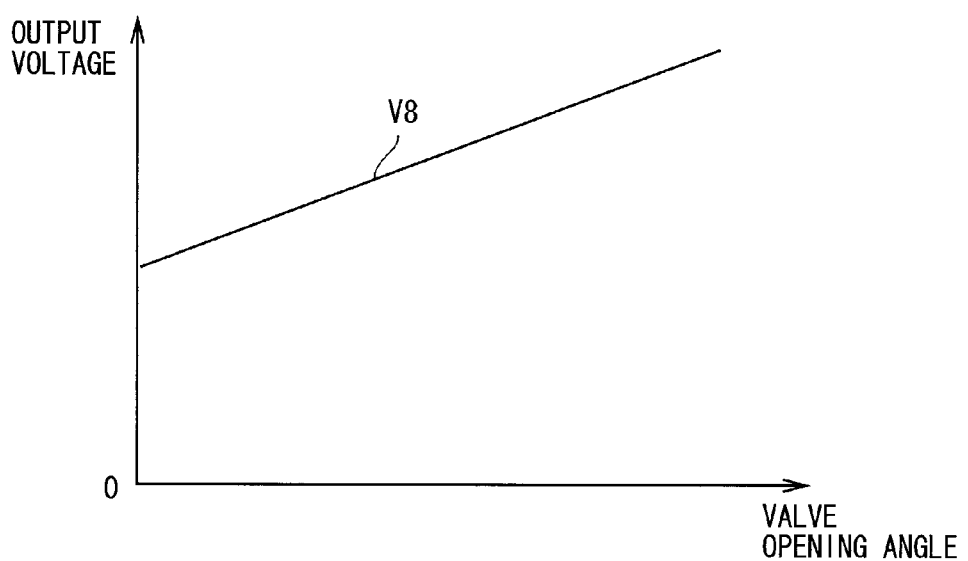
FIG. 20 is a characteristic diagram illustrating an output signal in a failure state of the position detecting device according to the fourth embodiment.

A position detecting device according to a fourth embodiment is illustrated in FIGS. 19 and 20.

A characteristic of a signal output by the position detecting device of the fourth embodiment to the ECU 30 in the normal state is illustrated in FIG. 19.

In the fourth embodiment, in the normal state, the ECU 30 uses a voltage signal V7 of the positive characteristic output from one integrated circuit as a control signal for driving the motor 9. Therefore, the factory write bit to be stored is set to "0" in both of the storage units 64 and 94 of the two integrated circuits 11 and 21.

Also, the ECU 30 uses a voltage signal V8 output from the other integrated circuit as a monitor signal for monitoring the operation states of the two integrated circuits 11 and 21.

The voltage signal V8 output from the integrated circuit for monitor operation is always higher in voltage than the voltage signal V7 output from the integrated circuit for control operation, and its inclination is gentle or small.

When the output terminals 18 and 28 of the two integrated circuits 11 and 21 are short-circuited, the signal "1" is output from the second comparator circuit in the integrated circuit for control operation. In this case, the cutoff circuit of the integrated circuit for control operation turns off the switch of the output signal line. With this operation, FIG. 20 illustrates that the ECU 30 controls the opening angle of the throttle valve 4 according to the voltage signal V8 output from the integrated circuit for monitor operation. As a result, the ECU 30 controls the vehicle to be safe according to the voltage signal V8 of the position detecting device.

(Other Embodiments)

In the above-mentioned embodiments, the position detecting device used in the electronic control throttle mounted on the vehicle has been described. On the contrary, the position detecting device can be applied to a variety of sensors that detect a rotation angle of an accelerator pedal provided in an accelerator pedal module, a rotation angle of a tumble control valve, or a stroke quantity of a clutch actuator.

The position detecting device is not limited to the disclosed embodiments but may be implemented in various configurations.

What is claimed is:

1. A position detecting device comprising:
a plurality of integrated circuits, each including a magnetism detection element that outputs a signal corresponding to a magnetism of a magnetic generation unit disposed in an object to be detected, a signal processor circuit that processes the signal output from the magnetism detection element, and an output circuit that outputs the signal processed by the signal processor circuit from an output terminal to an electronic control unit that controls a vehicle,
wherein the output circuit includes:
a power side transistor and a ground side transistor which are connected in series with signal lines that connect a power supply and a ground and control a voltage of the signal lines;
a control circuit that controls the power side transistor and the ground side transistor based on the signal processed by the signal processor circuit;
an output signal line having one end connected to a connection point of the signal lines connecting the power side transistor and the ground side transistor, and the other end connected to the output terminal;
a power side current detector circuit that detects a current flowing in the signal line between the power supply and the connection point;
a ground side current detector circuit that detects a current flowing in the signal line between the connection point and the ground;
a first comparator circuit that outputs a first abnormal signal when a current value detected by the power side current detector circuit is larger than a normal value of a current flowing from the power supply to the ground in a normal state;
a second comparator circuit that outputs a second abnormal signal when a current value detected by the ground side current detector circuit is larger than the normal value; and
a cutoff unit that cuts off conduction of the output signal line when the first abnormal signal is output from the first comparator circuit, or when the second abnormal signal is output from the second comparator circuit.

2. The position detecting device according to claim 1, wherein:
when the electronic control unit controls the position of the object based on the output signal of the integrated circuit having the signal processor circuit for processing the signal so that the signal output from the output terminal increases as the amount of movement of the object increases,
the cutoff unit cuts off the conduction of the output signal line when the second abnormal signal is output from the second comparator circuit.

3. The position detecting device according to claim 1, wherein:
when the electronic control unit controls the position of the object based on the output signal of the integrated circuit having the signal processor circuit for processing the signal so that the signal output from the output terminal decreases as the amount of movement of the object increases,
the cutoff unit cuts off conduction of the output signal line when the first abnormal signal is output from the first comparator circuit.

4. The position detecting device according to claim 1, wherein:
each of the integrated circuits includes a storage unit that stores first information indicating that the electronic control unit controls the position of the object based on the output signal of the integrated circuit having the signal processor circuit for processing the signal so that the signal output from the output terminal increases as the amount of movement of the object increases, or second information indicating that the electronic control unit controls the position of the object based on the output signal of the integrated circuit having the signal processor circuit for processing the signal so that the signal output from the output terminal decreases as the amount of movement of the position of the object increases;
the cutoff unit cuts off conduction of the output signal line when the first information is stored in the storage unit, and the second abnormal signal is output from the second comparator circuit; and
the cutoff unit cuts off conduction of the output signal line when the second information is stored in the storage unit, and the first abnormal signal is output from the first comparator circuit.

5. The position detecting device according to claim 1, wherein:
    each of the integrated circuits includes a counter circuit that periodically renders conductive the output signal line, which is cut off by the cutoff unit.

6. The position detecting device according to claim 2, wherein:
    each of the integrated circuits includes a storage unit that stores first information indicating that the electronic control unit controls the position of the object based on the output signal of the integrated circuit having the signal processor circuit for processing the signal so that the signal output from the output terminal increases as the amount of movement of the object increases, or second information indicating that the electronic control unit controls the position of the object based on the output signal of the integrated circuit having the signal processor circuit for processing the signal so that the signal output from the output terminal decreases as the amount of movement of the position of the object increases;
    the cutoff unit cuts off conduction of the output signal line when the first information is stored in the storage unit, and the second abnormal signal is output from the second comparator circuit; and
    the cutoff unit cuts off conduction of the output signal line when the second information is stored in the storage unit, and the first abnormal signal is output from the first comparator circuit.

7. The position detecting device according to claim 2, wherein:
    each of the integrated circuits includes a counter circuit that periodically renders conductive the output signal line, which is cut off by the cutoff unit.

8. The position detecting device according to claim 3, wherein:
    each of the integrated circuits includes a storage unit that stores first information indicating that the electronic control unit controls the position of the object based on the output signal of the integrated circuit having the signal processor circuit for processing the signal so that the signal output from the output terminal increases as the amount of movement of the object increases, or second information indicating that the electronic control unit controls the position of the object based on the output signal of the integrated circuit having the signal processor circuit for processing the signal so that the signal output from the output terminal decreases as the amount of movement of the position of the object increases;
    the cutoff unit cuts off conduction of the output signal line when the first information is stored in the storage unit, and the second abnormal signal is output from the second comparator circuit; and
    the cutoff unit cuts off conduction of the output signal line when the second information is stored in the storage unit, and the first abnormal signal is output from the first comparator circuit.

9. The position detecting device according to claim 3, wherein:
    each of the integrated circuits includes a counter circuit that periodically renders conductive the output signal line, which is cut off by the cutoff unit.

* * * * *